106-88   AU 113   EX
3/17/81  OR  4,256,500

United States Patent [19]

Turpin, Jr.

[11] 4,256,500

[45] Mar. 17, 1981

[54] POZZOLAN CEMENT COMPOSITIONS

[75] Inventor: Raymond C. Turpin, Jr., Atlanta, Ga.

[73] Assignee: The Partners Limited, Atlanta, Ga.; a part interest

[21] Appl. No.: 120,838

[22] Filed: Feb. 12, 1980

Related U.S. Application Data

[63] Continuation of Ser. No. 899,699, Apr. 24, 1978, abandoned, which is a continuation-in-part of Ser. No. 823,321, Aug. 11, 1977, abandoned, which is a continuation-in-part of Ser. No. 721,050, Sep. 7, 1976, abandoned.

[51] Int. Cl.³ .................................................. C04B 7/02
[52] U.S. Cl. .......................................... 106/88; 106/90; 106/97; 106/98; 106/DIG. 1
[58] Field of Search ......................... 106/86, 87, 88, 90, 106/97, 98, 314, 315, DIG. 1

[56] References Cited

U.S. PATENT DOCUMENTS

| | | | |
|---|---|---|---|
| 2,752,261 | 6/1956 | Dournaud | 106/117 |
| 2,785,988 | 3/1957 | Lipkind et al. | 106/109 |
| 3,663,287 | 5/1972 | Mizunuma et al. | 106/86 |
| 3,765,920 | 10/1973 | Humphrey | 106/288 B |
| 3,827,895 | 8/1974 | Copeland | 106/99 |
| 3,832,196 | 8/1974 | Broussard | 106/89 |
| 3,854,968 | 12/1974 | Minnick et al. | 106/109 |
| 3,870,535 | 3/1975 | Minnick et al. | 106/118 |

Primary Examiner—James Poer
Attorney, Agent, or Firm—Kirkland & Ellis

[57] ABSTRACT

A cement composition comprising cement, a pozzolan material, fine aggregate, air, water, at least one alkali metal constituent selected from the group consisting of sodium, potassium, and lithium ions, and at least one anionic constituent which is capable of forming complexes with ferric ions, is soluble in water, and forms a calcium salt which is also water soluble, wherein the alkali metal constituent is present in an amount up to approximately 4.0 percent by weight, in terms of the equivalent weight of sodium ions, of the pozzolan material; the anionic constituent is present in an amount up to approximately 6.0 percent by weight, in terms of the equivalent weight of chloride ions, of the pozzolan material; and the cement composition is further characterized by: (a) having a solid volume ratio of cement to the pozzolan material within the range of approximately 0.05 to 2.0; (b) having a ratio of the volume of paste (fly ash, cement, air, and water) to the solid volume of sand within the range of approximately 0.75 to 2.5; and (c) having a ratio of the solid volume of cement to the volume of mortar less than about 0.19. The cement composition of the present invention is substantially less expensive than cement compositions presently employed in the industry having equivalent compressive strengths.

50 Claims, 1 Drawing Figure

FIG-1

POZZOLAN CEMENT COMPOSITIONS

This is a continuation, of application Ser. No. 899,699, filed Apr. 24, 1978, now abandoned which was a continuation-in-part of Ser. No. 823,321, filed Aug. 11, 1977 now abandoned, which was a continuation-in-part of Ser. No. 721,050, filed Sept. 7, 1976 (now abandoned).

BACKGROUND

The present invention relates to cement compositions utilizing a pozzolan material, preferably fly ash. One of the principal advantages of the present invention is that it provides cement compositions which are significantly cheaper per unit volume than conventional cement compositions having essentially the same structural properties. This result is achieved through proper proportioning of the various ingredients in the cement composition and the substitution of relatively large amounts of inexpensive pozzolan material for the more expensive cementitious ingredients normally utilized.

It has been known for many years that various finely divided, silicious materials react with lime in the presence of moisture to produce cementitious material which may be mixed with sand and stone to form a product similar to modern concrete. These silicious materials, which are commonly referred to as pozzolans, occur naturally or are by-products of various manufacturing processes. Examples of pozzolan materials include blast furnace slag, volcanic ash, calcined shale, trass, pumice, diatomaceous earth, silicious clays, and fly ash, which is the fine, solid by-product contained in the gases from the combustion of pulverized coal. With the advent of increasing public environmental concerns and the resulting limitations imposed on gaseous and particulate emissions from such combustion reactions, increasingly large amounts of fly ash are being recovered from the stack gases of commercial coal burning facilities, particularly high efficiency electric power generating plants. Despite the resulting availability of considerable quantities of fly ash, at present there is no major commercial use for fly ash.

Fly ash, as well as other pozzolan materials, have been utilized to replace a portion of the more expensive cementitious ingredients conventionally utilized in various cement compositions, but full utilization of fly ash has not been achieved. The primary obstacle to the use of larger proportions of fly ash in these cement compositions is that the reaction of pozzolan materials, including fly ash, with lime is slow compared to the normal cement reaction. Thus, pozzolan containing cement compositions have an early compressive strength (typically measured at seven or twenty-eight days) which is significantly less than similar cement compositions based on conventional cementitious materials, such as Portland cement. If pozzolan is substituted for too large a proportion of the cement, the resulting cement composition will have a poor initial strength and will require additional time prior to imposition of the service load. It may be necessary to provide external support for the cement composition until the pozzolanic reaction has proceeded sufficiently so that the cement composition is self-supporting.

The slow curing time of cement compositions having a high proportion of pozzolan material is unacceptable or undesirable for most commercial applications. Attempts have been made to solve this problem by utilizing heat to accelerate the curing rate and by adding large amounts of excess lime and/or various chemicals. These techniques have produced various specialized products, but they have not accelerated the pozzolanic reaction sufficiently to be useful in preparing cement compositions suitable for a broad range of structural applications.

The present invention concerns cement compositions which realize the economic benefits of using larger amounts of pozzolan material. This result is achieved by properly proportioning the ingredients in the cement composition and by including in the composition certain alkali metal ions and, in addition, anionic constituents capable of forming complexes with ferric ions, i.e., iron complexing agents. By utilizing the appropriate amounts of cement, pozzolan, water, and fine aggregate, it is possible to minimize the void content of the cement composition and to insure maximum compressive strength. The addition of relatively large amounts of sodium, potassium, and/or lithium ions apparently accelerates the pozzolanic reaction and makes it possible to add the larger amounts of pozzolan material, in the proper proportion to the other ingredients of the cement composition, without incurring a concomitant loss in early compressive strength. The iron complexing agents assist in promoting early compressive strength by chemically tying up ferric ions which under normal circumstances would engage in chemical reactions inhibiting the cementitious reactions necessary to the development of compressive strength.

Because these benefits can be achieved when the requisite alkali metal ions and iron complexing anions are provided in the form of sodium chloride, the present invention has the further significant advantage that the cement compositions can be prepared from sea water or other brackish waters. Prior to the present invention it was generally believed that the incorporation of sea water in cement compositions would be deleterious to the product. The present invention now makes it possible to prepare relatively inexpensive cement compositions with sea water, an advantage which is particularly useful in localities where sea water is more readily available than fresh water.

SUMMARY OF THE INVENTION

The present invention relates to a cement composition which maximizes the substitution of relatively inexpensive pozzolan material for Portland cement.

The cement compositions of the present invention comprise cement, a pozzolan material, fine aggregate, air, water, at least one alkali metal constituent selected from the group consisting of sodium, potassium, and lithium ions, and at least one anionic constituent which is capable of forming complexes with ferric iron ions, is soluble in water, and forms a calcium salt which is also water soluble; wherein the alkali metal constituent is present in an amount up to approximately 4.0 percent by weight, in terms of the equivalent weight of sodium ions, of the pozzolan material; the anionic constituent is present in an amount up to approximately 6.0 percent by weight, in terms of the equivalent weight of chloride ions, of the pozzolan material, and the cement composition is further characterized by:

(a) having a solid volume ratio of cement to the pozzolan material within the range of approximately 0.05 to 2.0;

(b) having a ratio of the volume of paste (fly ash, cement, air, and water) to the solid volume of sand within the range of approximately 0.75 to 2.5; and (c) having a ratio of the solid volume of cement to the volume of mortar less than about 0.19.

It is an object of this invention to provide a cement composition which maximizes the substitution of relatively inexpensive pozzolan material, such as fly ash, for more expensive cement.

It is an object of the invention to provide a cement composition which maximizes the substitution of relatively inexpensive pozzolan material for cement without reducing the early compressive strength of the cement composition.

It is a further object of the invention to provide a cement composition which is significantly less expensive than an equal volume of a conventional cement composition having equivalent structural properties.

It is another object of this invention to provide an economical cement composition which can be prepared from brackish or sea water.

Further objects of the present invention will be apparent from the detailed description of the invention which follows.

DETAILED DESCRIPTION OF THE INVENTION

The present invention relates to cement compositions of all types in which Portland cement or similar cementitious material reacts with water to bind together various inert ingredients, such as sand, stone, crushed rock, etc. As used herein the term "cement composition" refers to all such cemetitious mixtures including, for example, those generally designated in the art as mortar, grout, and concrete. The present invention is applicable, but not limited, to the following types of cement compositions: ready mixed concrete compositions, prefabricated concrete structural elements prepared by autoclaving or steam curing cement compositions, concrete compositions utilized in large mass structures, such as gravity dams, and concrete compositions employed as highway bases and surfaces. These cement compositions may be employed with additional reinforcing elements conventionally utilized in the art to supplement their structural properties.

Despite the inherent economic advantages associated with the substitution of pozzolan materials, such as fly ash, typical pozzolan cement compositions, such as concrete, presently used in commercial practice contain enough pozzolan material to replace only about 20 to 30 percent by weight of the cement normally present. (If fly ash is substituted for 30 percent of the cement, the cement:fly ash ratio, as hereinafter defined, is approximately 2.24). The primary obstacle to the utilization or larger proportions of fly ash is the slow reaction rate of pozzolan material compared with the normal reaction of cementitious materials such as Portland cement. Attempts to substitute larger amounts of pozzolan material for cement have resulted in cement compositions having an undesirably slow setting time and unacceptably poor early strength characteristics. As a result costly delays are encountered before the cement composition can bear a service load. Prior to the present invention attempts to realize the economic advantages associated with the utilization of large amounts of pozzolan material in cement compositions have been unsuccessful largely because of the undesirable properties of the resulting products.

The present invention is applicable to cement compositions containing pozzolan and cement, in relative proportions such that the cement-pozzolan ratio is within the range of approximately 0.05 to 2.0. Preferably, the cement-pozzolan ratio is within the range of approximately 0.1 to 2.0. For present purposes the "cement:pozzolan ratio" means the ratio of the solid volume of dry cement to the solid volume of dry pozzolan material contained in the cement composition. As used herein the term "solid volume" (particularly as applied to the proportions of cement, pozzolan material, and fine aggregate or sand) means the volume of the solid constituent exclusive of its voids and is determined by dividing the weight of the material by its specific gravity.

The cement compositions of the present invention include cement, pozzolan, fine aggregate or sand, water, and entrained and entrapped air, which enters the cement composition during mixing of these ingredients. The cement constituents which may be utilized include any of the typical Portland cements known in the art, such as those meeting the description of ASTM Standard C 150-74, Types I, II, and III. However, the proportion of cement contained in the present cement compositions is considerably less than that normally utilized in conventional cement compositions having comparable structural properties.

The pozzolan materials which may be utilized include any of the materials falling within the definition of Class N, F, or S set forth in ASTM Standard C 618-72. Suitable pozzolan materials include trass, volcanic ash, pumice, slag, diatomaceous earth, silicious clays, calcined shale, and fly ash. Fly ash is the preferred pozzolan material, because it is readily available, inexpensive, and has certain desirable physical properties. The shape and size distribution of fly ash particles improve the workability of cement compositions, and acceptable workability of such compositions containing fly ash and can generally be achieved with less water than with other pozzolan materials. This reduction in the water requirement aids in minimizing the void content of the cement composition and increases the compressive strength of the cement product.

The cement compositions also comprise fine aggregate or sand which may be any clean durable sand conventionally used in the art for preparing mortar or concrete. Suitable sands include those which are deficient in material passing through a No. 50 mesh screen. The amount of sand incorporated in the cement composition is determined by the volume of the cement composition and the strength properties which are desired, taking into account that the paste:sand ratio, as defined herein, must be kept within the defined range.

The cement composition also includes sufficient water to comply with ASTM and ACI standards for workability. Within these parameters it is desirable to minimize the quantity of water added to maximize the strength of the cement composition.

The cement compositions of the present invention may also include any of the chemical ingredients commonly known to those skilled in the art as "chemical admixes". The basic types of chemical admixes presently utilized are set forth in ASTM Standard C 494-71 and are generally classified according to their function, i.e., whether they are utilized to retard or accelerate the cementitious chemical reactions, to reduce the water requirement, or for a combination of these reasons. The chemical admixes which are used commonly today include derivatives of lignosulfonic acid and its salts, hydroxylated carboxylic acids and their salts, and polymer derivatives of sugar. More recently certain chemical admixes known as "super plasticizers" or "super water reducers" have been employed which consist primarily of salts of organic sulfonates of the type $RSO_3Na$ where R is a complex organic group, frequently of high molecular weight, e.g. melamine, naphthalene, or lignin. One or more of these chemical admixes may be incorporated in the present cement compositions in the amounts conventionally utilized in the art.

The foregoing cement composition constituents may be combined in any manner conventionally utilized in the art and are generally mixed in accordance with the procedures set forth in ASTM Standard C-94.

During the curing and hardening of the cement composition air and water leave voids which cause weakness in the cured product. To maximize the early compressive strength properties of the present cement compositions it is desirable to minimize the voids in the cement composition, since an inverse relationship exists between the volume of such voids and the compressive strength of the cement composition. It has now been found that these voids are minimized, if enough pozzolan material is added to a mixture comprising cement, sand, water, and air so that the volume ratio of paste (cement, pozzolan, water, and air) to sand (fine aggregate) is in the range of approximately 0.75 to 2.5 and, preferably, in the range of approximately 1.0 to 2.0. For present purposes the "paste:sand ratio" means the ratio of the volume of the paste constituents (cement, pozzolan, water, and air) to the solid volume of dry sand (fine aggregate). Although the optimum paste:sand ratio for any specific cement composition depends on the type of sand and cementitious ingredients utilized, the optimum amount will fall within the foregoing range.

The early compressive strength is also increased by accelerating the pozzolanic reaction, i.e., the reaction between calcium hydroxide, which is formed during hydration of the normal cementitous components, with the silicates present in the pozzolan material to form additional calcium silicate. The rate of this reaction is dependent on three mechanisms. First, the rate of hydration of the cement controls the rate of formation of additional calcium hydroxide needed in the pozzolanic reaction. Chemicals which increase the hydration of cement itself will, therefore, increase the pozzolanic reaction concurrently taking place. Secondly, the rate of dissolution of silica from the pozzolanic material into the reaction medium will govern the availability of the other reactant silica. Thus, materials which stimulate the dissolution of silica will also increase the rate of the pozzolanic reaction by increasing the availability of silica for reaction with the calcium hydroxide. Finally, the rate of the pozzolanic reaction is influenced negatively by the formation of ferric hydroxide gel which retards the reaction of calcium hydroxide and silica.

Iron and ferrous or ferric ions are components normally present in most pozzolanic materials, particularly fly ash, and are also present in most cements. However, the eventual controlled release of ferrous and ferric ions is beneficial and eliminates excess hydroxide ions, formed during the hydration or available from other chemical reducing or accelerating agents, which would tend to drive the reaction of calcium hydroxide with silica in the reverse direction. Thus, the pozzolanic reaction is accelerated by materials which initially form ferric ion complexes, such materials being generally referred to herein as iron complexing agents.

It has now been found that two of these factors determining the rate of the pozzolanic reaction can be positively influenced by the addition of one or more anionic constituents, meeting the following criteria:
(a) the anion forms ferric ion complexes;
(b) the anion is soluble in water; and
(c) the calcium salt of the anion is also soluble in water.
While the first criteria is important to the pozzolanic reaction for the reason set forth in the previous paragraph, the second two criteria assure that the anion will be available in the aqueous environment of the hardening cement compositions and that its calcium salt will not precipitate out of that environment or otherwise physically impede the cementitous and pozzolanic reactions taking place.

For purposes of the present invention an anion and its calcium salt are considered water soluble if they have a solubility approximately equal to the water solubility of calcium hydroxide and preferably in excess thereof.

Examples of anions which meet these three requirements and are useful in the present invention are chloride, bromide, nitrite, thiocyanate, cyanide, and lactate ions. One or more of the anions in this group may be employed in the cement compositions of the present invention. It has been noted that any measureable amount of these anions will have some identifiable effect on the pozzolanic reaction rate and the early compressive strength of the cement composition. The cement compositions may contain sufficient chloride ions to constitute up to approximately 6.0 percent by weight of the pozzolan material present and, preferably, from approximately 0.1 to 2.4 percent by weight of the pozzolan material. In cement compositions employing bromide, nitrite, thiocyanate, cyanide or lactate ions these ions should be present in an amount corresponding to equal quantities of chloride ions within the general and preferred ranges set out above. In cement compositions employing combinations of the anions the total amount of these ions should be maintained within the same general and preferred ranges.

A portion of the chloride, bromide, lactate, nitrite, thiocyanate, or cyanide ions may be replaced and supplemented by one or more ions selected from the group consisting of sulfate, thiosulfate, nitrate, sulfite, or silicylate ions. These ions do not fully meet the three criteria set forth previously. Sulfate, nitrate, sulfite, or silicylate ions are much weaker iron complexing agents in the alkaline environment of concrete than the ions identified in the previous paragraph, and the sulfate and sulfite ions are much less soluble in water. Thiosulfate is only a weak iron complexing agent in the alkaline environment of cement compositions and partially decomposes into sulfate which forms insufficiently soluble calcium sulfate in these compositions. Thus, although these ions are partially effective in complexing ferric ions in pozzolan cement compositions, they cannot be used to totally replace the chloride, bromide, nitrite, thiocyanate, cyanide, and/or lactate ions in the pozzolan cement compositions of this invention. Preferably the pozzolan cement compositions should always contain sufficient anions fully meeting the criteria previously set forth, such as those selected from the group consisting of chloride, bromide, nitrite, thiocyanate, cyanide, and/or lactate ions to constitute at least approximately 0.1 percent by weight, in terms of the equivalent weight of chloride ions, of the pozzolan material. In addition, one or more of the ions in the group consisting of thiosulfate, nitrate, sulfate, sulfite, or salicylate ions may be used in an amount such that the total amount of anions present from both groups, i.e., chloride, bromide, nitrite, thiocyanate, cyanide, lactate, thiosulfate, nitrate, sulfate, sulfite, and salicylate, is present in an amount up to approximately 6.0 percent by weight, in terms of the equivalent weight of chloride ions, of the pozzolan material.

It has been found that the pozzolanic reaction can be accelerated further by adding sufficient quantities of at least one alkali metal ion selected from the group consisting of sodium, potassium, and lithium ions. These ions apparently accelerate the pozzolanic reaction by the third means, i.e., by increasing the water solubility of the silicious constituents in the pozzolan material, thereby permitting the silica in solution to react with excess lime liberated by the hydration of the cement.

Any measurable amounts of sodium, potassium and/or lithium ions will have some identifiable effect in catalyzing the pozzolanic reaction and offsetting the reduction in early compressive strength usually associated with high pozzolan content cement compositions. If sodium ions are utilized, the cement composition should contain sodium ions in an amount comprising up to approximately 4.0 percent by weight of the pozzolan material present in the cement composition, and preferably, sufficient sodium ions should be present to constitute from approximately 0.2 to 1.6 percent by weight of the pozzolan material. In cement compositions employing potassium or lithium ions as the alkali ion constituent, the potassium or lithium ions may be present in amounts corresponding to equal quantities of sodium ions within the general and preferred ranges set out above. It is also possible to utilize mixtures of sodium, potassium, and/or lithium ions, with the total quantity of sodium potassium and/or lithium ions again being translated into the equivalent molecular weight of sodium ions. When alkali metal ions are added in amounts in excess of 4.0 percent by weight, in terms of the equivalent weight of sodium ions, of the pozzolan material, the beneficial effects are diminished, and after the water has evaporated from its surface, the exterior of such a cement composition is noticeably discolored by a powdery white residue.

The following are examples of pozzolan cement compositions within the present invention:

COMPOSITION 1

188 grams Type I cement
500 grams fly ash
1250 grams of a 50/50 mixture of sands from Ottawa, Illinois
224 milliliters of water
20 grams NaCl (1.57 percent sodium ions and 2.43 percent chloride ions per weight of fly ash)
0.29 cement:pozzolan ratio
1.09 paste:sand ratio
0.06 volume of cement:volume of mortar

COMPOSITION 2

188 grams Type I cement
500 grams fly ash
1250 grams of a 50/50 mixture of sands from Ottawa Illinois
217 milliliters of water
1.5 grams NaSCN
8.4 grams $NaNO_3$
9.6 grams $Na_2S_2O_3$ (1.10 percent sodium ions and the equivalent of 1.27 percent chloride ions per weight of fly ash)
0.29 cement:pozzolan ratio
1.07 paste:sand ratio
0.06 volume of cement:volume of mortar

COMPOSITION 3

188 grams Type I cement
500 grams fly ash
1250 grams of a 50/50 mixture of sands from Ottawa, Illinois
215 milliliters of water
2.5 grams NaSCN
10.0 grams $NaNO_3$
1.0 grams $Na_2SO_4$ (0.8 percent sodium ions and the equivalent of 1.16 percent chloride ions per weight of the fly ash)
0.29 cement:pozzolan ratio
1.07 paste:sand ratio
0.06 volume of cement:volume of water

COMPOSITION 4

188 grams Type I cement
500 grams fly ash
1250 grams of a 50/50 mixture of sands from Ottawa, Illinois
207 milliliters of water
1.0 grams sodium silicylate
5.0 grams NaSCN
10.0 grams $NaNO_3$
3.18 grams $Na_2S_2O_3$ (1.04 percent sodium ions and the equivalent of 1.46 percent chloride ions per weight of the fly ash)
0.29 cement:pozzolan ratio
1.09 paste:sand ratio
0.06 volume of cement:volume of mortar One of the preferred additives is sodium chloride which may be incorporated into the cement composition in the form of sea water. Sea water is particularly useful, because it contains appreciable amounts of potassium and sulfate ions in addition to sodium chloride. The following is a typical chemical analysis of the ionic constituents of sea water:

| Ion | (ppm) |
| --- | --- |
| Sodium | 10,000 |
| Potassium | 700 |
| Calcium | 440 |
| Magnesium | 1,316 |
| Sulfate | 2,515 |
| Chloride | 20,750 |

The beneficial effect of sea water is particularly surprising, since heretofore it has been generally accepted that sea water is deleterious to cement compositions. The present invention now provides cement compositions utilizing sea water, thereby making cement compositions more readily available in areas where sea water is plentiful and fresh water relatively scarce.

In another specific embodiment it has been found that the benefits of the present invention can be achieved without adding an alkali metal constituent if chloride ion is added in the form of calcium chloride in an amount sufficient to comprise approximately 0.5 to 4.0 and preferably from approximately 0.5 to 3.0 percent by weight of the pozzolan material present and the other ingredients of the cement composition are added in accordance with the proportions described herein. These cement compositions may contain alkali metal ions, iron complexing ions and other anions in the amounts previously set forth. However, cement compositions in which chloride ion is added with an alkali metal constituent demonstrate larger early compressive strengths than analogous cement compositions in which the chloride ion is added as calcium chloride.

Another advantage of the present invention is that the benefits of using relatively large amounts of fly ash can be achieved without adding extraneous lime, i.e., lime other than that produced in situ by hydration of the cement. The cement compositions of the present invention, may tolerate extraneous lime in amounts up to approximately 4.0 percent by weight of the fly ash, although the setting time of the product is reduced. When additional lime is added in amounts exceeding about 4.0 percent by weight of the pozzolan material, the early strength of the cement composition is diminished. Accordingly, the present cement compositions may contain additional extraneous lime in amounts less than approximately 4.0 percent by weight of the pozzolan material.

EXAMPLES

Example 1

This example demonstrates the procedure for determining the requisite amount of fly ash to maximize the compressive strength of a cement composition. A number of different compositions were prepared employing various amounts of cement, and the amount of fly ash for each cement composition was varied. The 28-day compressive strength of each cement composition was measured and is reported in Table I.

The cement utilized in each of the tests consisted of a blend of equal portions by weight of three Type I Portland cements, as defined in ASTM Standard C 150-74, which were obtained from three different mills. This cement was utilized throughout the examples herein except as otherwise noted.

Unless otherwise noted, the sand utilized in each of the tests in this example and the other examples herein, consisted of a mixture of equal proportions of a relatively fine (No. 109) and a relatively coarse (No. 190) sand from Ottawa, Illinois. In tests G-1 pond screenings passing through a No. 200 mesh screen were utilized in addition to the Ottawa sand. In tests I-1 through I-5 the sand consisted of equal amounts of a commercially available sand known as Waugh sand from Montgomery, Ala., and a commercially available sand typical of those in Atlanta, Ga.

Unless otherwise noted, the pozzolan material utilized in each of the tests in this example and the other examples herein consisted of Bowen fly ash recovered from the combustion of pulverized bituminous coal at the Bowen Plant of the Georgia Power Company. In tests H-1 through H-3 and K-1 through K-3 a different pozzolan material was utilized comprising fly ash collected from the McDonough Plant of the same power company.

The mixing procedure utilized in each test was the basic procedure described in ASTM Standard C 109 with a few modifications. First the cement, fly ash, and water were added to the mixer described in the standard test procedure. The amount of cement utilized remained constant for a given series of tests, but the amount of water utilized in each test was adjusted to obtain relatively equal slumps (a measure of workability) for all tests within a given series of tests, e.g. tests A-1 through A-4. The cement, fly ash, and water were then mixed at the slow speed for 30 seconds, after which the sand or other fine aggregate was added to the mixer during a 30 second period while mixing at the slow speed. These ingredients were then mixed at the medium speed for an additional 30 seconds. The amount of sand added was adjusted to provide relatively equal volumes for all samples prepared.

The mixer was then turned off for 90 seconds, and during the first 15 seconds, the sides of the mixer were scraped down. The cement composition was then mixed at the medium speed for an additional 60 seconds.

During the first 90 seconds after the final mixing, the bowl was removed from the mixer. One-half of the mortar was removed and measured for slump, the test taking approximately 30 to 45 seconds to perform. If the slump varied from the slump of the other test samples within a given series of tests, the cement composition was reformulated to achieve approximately equivalent workability of all test compositions within the series of tests. The remaining half of the test sample was then tested by the procedure defined herein to determine the void content. Following completion of these tests, both fractions were returned to the mixing bowl and were mixed for fifteen seconds at the medium speed. The cement composition was compacted into six standard 2-inch cubes for measurement of compressive strength. The cubes were cured using lime water under ASTM Standard C 109 conditions. All tests were conducted under standard conditions of temperature and humidity specified in the same ASTM standard.

The slump was measured utilizing a measuring cone as described in paragraph 2.3 of ASTM Standard C 128-73. Initially one-half of the cone was filled with the test sample and rodded 25 times with a rounded tip rod having a diameter of $\frac{1}{4}$". The remainder of the metalic cone was then filled and rodded 25 times with the rod passing through the top layer and barely into the second to consolidate the two layers. Following the second rodding, excess material was struck from the top of the cone utilizing the edge of a trowel, and the cone was slowly removed during a ten second interval. The cone was placed beside the conical mass of the test sample material, and the difference between the height of the standard cone (the original height of the sample) and the height of the sample after removal of the cone was then measured as the slump.

The volume of potential voids (water and entrained and entrapped air) was determined utilizing the following experimental procedure. A metallic cylinder, closed at one end and having a known volume and weight, was utilized to determine the density of each cement composition prepared. The cylinder was filled in three equal parts with subsequent rodding after each addition of the test sample as in the slump test. Following the rodding of the third layer, the excess test sample material was struck from the top and the density determined by dividing the volume of the cylinder by the difference in weight between the filled and unfilled cylinder. By knowing the total weight of the test sample material produced in a given test and the density, the total volume of the sample prepared could be computed. The difference between the total volume of the test sample and the total volume of the individual solid constituents in the test sample represents the void content of the sample.

The composition of the various test samples and the results of these tests are reported in Table I. These results indicate that for a given cement composition there is an optimum amount of pozzolan material which can be added to maximize the compressive strength of that composition. This maximum is reached when sufficient pozzolan material is added that the cement:pozzolan ratio is in the range of approximately 0.1 to 2.0. When more than the maximum amount of pozzolan material is added to the cement composition there is a commensurate decrease in the 28-day strength. The test results indicate that the 28-day strength of such pozzolan containing cement compositions is maximized when the void content of the composition is minimized as indicated by a paste:sand ratio between approximately 1.0 and 2.0.

TABLE I

| Example | Cement (gms.) | Pozzolan (gms.) | Sand (gms.) | Total Water (cc/1000 cc composition) | Total Voids % | Paste/Sand (vol.) | Cement/Pozzolan (vol.) | 28 Day Cube Strength (psi) |
|---|---|---|---|---|---|---|---|---|
| A-1 | 188 | 400 | 1352 | 231.4 | 26.35 | 0.96 | 0.36 | 2790 |
| A-2 | 188 | 500 | 1248 | 233.4 | 26.44 | 1.12 | 0.29 | 2780 |
| A-3 | 188 | 550 | 1183 | 239.4 | 27.06 | 1.24 | 0.26 | 2740 |
| A-4 | 188 | 600 | 1112 | 247.1 | 27.52 | 1.38 | 0.24 | 2690 |
| B-1 | 188 | 250 | 1489 | 247.7 | 27.64 | 0.78 | 0.58 | 2510 |
| B-2 | 188 | 350 | 1395 | 237.4 | 26.86 | 0.90 | 0.42 | 2700 |
| B-3 | 188 | 450 | 1293 | 235.3 | 26.82 | 1.05 | 0.32 | 2880 |
| B-4 | 188 | 550 | 1188 | 243.3 | 27.39 | 1.23 | 0.26 | 2610 |
| C-1 | 510.8 | — | 1373 | 256.3 | 31.99 | 0.93 | — | — |
| C-2 | 704.7 | — | 1227 | 267.4 | 31.24 | 1.16 | — | — |
| C-3 | 636.4 | — | 1286 | 262.4 | 31.14 | 1.06 | — | — |
| C-4 | 701.1 | — | 1221 | 271.0 | 31.59 | 1.17 | — | — |
| C-5 | 763 | — | 1173 | 276.2 | 31.58 | 1.26 | — | — |
| D-1 | — | 500 | 1472 | 204.7 | 23.95 | 0.80 | — | — |
| D-2 | — | 600 | 1366 | 207.7 | 23.80 | 0.94 | — | — |
| D-3 | — | 650 | 1312 | 209.3 | 24.11 | 1.02 | — | — |
| D-4 | — | 700 | 1256 | 212.8 | 24.09 | 1.11 | — | — |
| D-5 | — | 750 | 1132 | 222.0 | 24.88 | 1.34 | — | — |
| E-1 | 376 | 230 | 1352 | 247.2 | 27.69 | 0.96 | 1.27 | 7940 |
| E-2 | 376 | 290 | 1286 | 245.5 | 27.61 | 1.06 | 1.00 | 7960 |
| E-3 | 376 | 330 | 1244 | 248.1 | 27.57 | 1.13 | 0.88 | 8190 |
| E-4 | 376 | 400 | 1152 | 253.1 | 28.20 | 1.30 | 0.73 | 7300 |
| F-1 | 564 | 50 | 1352 | 261.9 | 28.83 | 0.96 | 8.74 | 10,632 |
| F-2 | 564 | 100 | 1305 | 261.7 | 29.07 | 1.03 | 4.37 | 11,520 |
| F-3 | 564 | 150 | 1250 | 264.6 | 29.22 | 1.12 | 2.91 | 10,960 |
| F-4 | 564 | 200 | 1188 | 266.4 | 29.31 | 1.23 | 2.18 | 11,360 |
| F-5 | 564 | 250 | 1113 | 271.2 | 29.98 | 1.38 | 1.75 | 10,580 |
| G-1 | 376 | 200* | 1243 | 267.5 | 31.63 | 1.06 | 1.53* | 4050 |
| G-2 | 376 | 250 | 1196 | 272.3 | 31.65 | 1.14 | 1.22 | 4260 |
| G-3 | 376 | 300 | 1138 | 275.7 | 32.09 | 1.25 | 1.02 | 4600 |
| H-1 | 188 | 200** | 1456 | 281.0 | 29.40 | 0.82 | 0.62 | 1850 |
| H-2 | 188 | 300 | 1345 | 273.5 | 28.98 | 0.97 | 0.41 | 2060 |
| H-3 | 188 | 400 | 1173 | 290.0 | 30.37 | 1.26 | 0.31 | 1960 |
| I-1 | 188 | 250 | 1380*** | 293.2 | 30.56 | 0.89 | 0.58 | 1750 |
| I-2 | 188 | 350 | 1312 | 271.0 | 29.10 | 0.99 | 0.42 | 2000 |
| I-3 | 188 | 450 | 1214 | 264.4 | 28.66 | 1.15 | 0.32 | 2190 |
| I-4 | 188 | 550 | 1125 | 265.4 | 28.73 | 1.32 | 0.26 | 2180 |
| I-5 | 188 | 600 | 1057 | 269.9 | 29.46 | 1.47 | 0.24 | 2100 |
| J-1 | 188 | 290**** | 1380 | 260.3 | 28.38 | 0.92 | 0.44 | 2430 |
| J-2 | 188 | 390 | 1256 | 261.5 | 28.24 | 1.11 | 0.32 | 2580 |
| J-3 | 188 | 490 | 1118 | 269.4 | 29.30 | 1.37 | 0.26 | 2430 |
| K-1 | 376 | 160.5** | 1345 | 273.4 | 29.38 | 0.97 | 1.54 | 5790 |
| K-2 | 376 | 230 | 1256 | 278.0 | 29.50 | 1.11 | 1.07 | 6210 |
| K-3 | 376 | 300 | 1157 | 284.7 | 30.07 | 1.29 | 0.82 | 6100 |

*Instead of a pozzolan material, the G-series examples contained the indicated amounts of pond screenings which passed through a 200 mesh screen. The cement:pozzolan ratio for this series of tests is actually the cement:fines dry volume ratio.
**The pozzolan utilized in this sample consisted of fly ash from the McDonough Plant of the Georgia Power Company.
***The sand utilized in this sample consisted of a 50:50 blend by weight of commercially available sand known as Waugh sand from Montgomery, Alabama and a commercially available sand typical of Atlanta, Georgia sands.
****The pozzolan utilized in this example consisted of New York fly ash obtained from the Army Corps of Engineers.

EXAMPLE 2

A series of tests were conducted illustrating the effect of including various ions in a pozzolan containing cement composition. The base composition or control utilized in these tests was as follows:
  188 grams cement
  500 grams fly ash
  1250 grams sand
  235 milliliters water
The cement:pozzolan ratio in this cement composition is 0.29, representing the optimum amount of fly ash for this composition as determined in examples A-1 through A-4 and B-1 through B-4 in Example 1.

The cement compositions in this example were prepared and tested as in Example 1 The water content of each test sample was adjusted in an attempt to prepare samples with equivalent workability within a given series of tests. The slump of each test sample was measured in sixteenths of an inch, and the compressive strength of the 2-inch cubes prepared from the various cement compositions was measured at the end of 7 and 28 days.

As noted in Table II various ionic materials in the amounts indicated were added in aqueous solution to the cement and pozzolan material at the beginning of the mixing procedure. The results of these tests are reported in Table II. Where tests were various ionic constituents were prepared on different days the results are compared to those of the base composition without ions prepared on the same day. The column at the extreme right in Table II indicates the ratio of the 28-day strength of the test sample to the 28-day strength of the control.

188 grams cement
550 grams ash
1222 grams sand
250 milliliters water The cement:pozzolan ratio of this cement composition is 0.27.

The remaining ingredients in the various test samples are set forth in Table III. These test samples were prepared and tested in accordance with the procedure set forth in Example 2, and the results are reported in Table III. These results indicate that the sodium and chloride ions increase the early compressive strength of high pozzolan content cement compositions.

TABLE III

| Test Sample | Total Water (cc/1000 cc composition) | Slump (16th") | Chemical | Chemical (grams) | Paste/Sand (vol.) | 7-Day Cube Strength (psi) | 28-Day Cube Strength (psi) | 28-Day Cube Strength vs. Control |
| --- | --- | --- | --- | --- | --- | --- | --- | --- |
| BA-1 | 247.6 | 14 | — | — | 0.80 | 1150 | 2510 | 1.00 |
| BA-2 | 248.3 | 15 | NaCl | 2.4 | 0.80 | 1440 | 2770 | 1.10 |
| BA-3 | 241.7 | 15 | NaCl | 8.3 | 0.80 | 1950 | 3430 | 1.37 |
| BA-4 | 231.8 | 14 | NaCl | 16.6 | 0.80 | 1940 | 4510 | 1.80 |
| BB-1 | 243.3 | 14 | — | — | 1.23 | 1380 | 2610 | 1.00 |
| BB-2 | 239.9 | 14 | NaCl | 5.2 | 1.23 | 2310 | 4610 | 1.77 |
| BB-3 | 231.3 | 14 | NaCl | 18.2 | 1.22 | 3040 | 6890 | 2.64 |
| BB-4 | 224.0 | 12 | NaCl | 36.6 | 1.22 | 3090 | 7580 | 2.90 |

TABLE II

| Test Sample | Total Water (cc/1000 cc composition) | Slump (16th") | Chemical | Chemical (grams) | Paste/Sand (vol.) | 7-Day Cube Strength (psi) | 28-Day Cube Strength (psi) | 28-Day Cube Strength vs. Control |
| --- | --- | --- | --- | --- | --- | --- | --- | --- |
| AA-1 | 233.8 | 10 | — | — | 1.13 | 1530 | 2890 | 1.00 |
| AA-2 | 231.0 | 11 | NaCl | 8.9 | 1.13 | 2900 | 5290 | 1.83 |
| AA-3 | 228.2 | 11 | NaCl | 17.9 | 1.13 | 3200 | 6250 | 2.16 |
| AA-4 | 223.2 | 12 | KCl | 11.9 | 1.12 | 2780 | 4830 | 1.67 |
| AA-5 | 218.5 | 12 | KCl | 23.9 | 1.12 | 3150 | 5900 | 2.04 |
| AB-1 | 237.7 | 12 | — | — | 1.13 | 1540 | 2660 | 1.00 |
| AB-2 | 235.6 | 14 | Na$_2$SO$_4$ . 10H$_2$O | 25.9 | 1.34 | 2580 | 3790 | 1.42 |
| AB-3 | 227.0 | 14 | Na$_2$SO$_4$ . 10H$_2$O | 51.7 | 1.34 | 3690 | 5340 | 2.01 |
| AB-4 | 228.9 | 14 | NaNO$_2$ | 11.1 | 1.12 | 2360 | 3810 | 1.43 |
| AB-5 | 222.1 | 12 | NaNO$_2$ | 22.2 | 1.12 | 2560 | 4330 | 1.63 |
| AC-1 | 230.9 | 12 | — | — | 1.14 | 1340 | 2950 | 1.00 |
| AC-2 | 228.2 | 11 | NaCl | 10.6 | 1.12 | 2560 | 5650 | 1.92 |
| AD-1 | 228.9 | 11.5 | — | — | 1.11 | 1450 | 2890 | 1.00 |
| AD-2 | 214.2 | 9 | CaCl$_2$ | 11.3 | 1.11 | 2030 | 3950 | 1.37 |

The results of these tests demonstrate that the use of the ions indicated improve both the 7-day and 28-day strengths of high pozzolan content cement compositions. However, over longer periods of time the advantages of using sodium sulfate by itself are doubtful. Test AD-2 also indicates that the early strength of high pozzolan cement compositions can be improved when calcium chloride is employed in the cement composition in the absence of an alkali metal ion.

EXAMPLE 3

Tests were conducted with cement compositions containing various amounts of sodium chloride. In tests BA-1 through BA-4, the base cement composition or control consisted of the following ingredients:
188 grams cement
250 grams fly ash
1475 grams sand
250 milliliters water The cement:pozzolan ratio of this cement composition is 0.58.

In tests BB-1 through BB-4, the base cement composition consisted of the following ingredients:

EXAMPLE 4

A series of tests were conducted to demonstrate that the advantages of the present invention can be achieved utilizing different sands and different pozzolan materials.

In tests CA-1 and CA-2 the base cement composition or control consisted of the following ingredients:
188 grams cement
400 grams of Bowen fly ash
1260 grams of a 50/50 blend of commercially available sands comprising Waugh sand from Montgomery, Ala. and a commercially available sand typical of Atlanta, Ga.
276 milliliters water
The cement:pozzolan ratio of this cement composition is 0.36.

The base cement composition or control utilized in test samples CB-1 through CB-3 consisted of the following constituents:
188 grams cement
390 grams of a New York fly ash
1260 grams of a 50/50 blend of sands from Ottawa, Ill.
262 milliliters water The cement:pozzolan ratio for this cement composition is 0.32.

Finally, tests CC-1 through CC-3 utilized the following control cement composition:
- 188 grams cement
- 444 grams of a Class N (natural) pozzolan obtained from the Oregon P.C. Co., Lime, Oreg.
- 1290 grams of a 50/50 blend of sands from Ottawa, Ill.
- 253 milliliters water The cement:pozzolan ratio for this cement composition is 0.36.

254 milliliters water

The cement:pozzolan ratio of this sample composition is 2.33.

The following composition was utilized as the control cement composition in test samples DC-1 through DC-4:
- 564 grams cement
- 50 grams fly ash
- 1343 grams sand
- 260 milliliters water The cement:pozzolan ratio for this sample is 8.74.

Finally, test samples DD-1 through DD-4 were pre-

TABLE IV

| Test Sample | Total Water (cc/1000 cc composition) | Slump (16th") | Chemical | Chemical (grams) | Paste/Sand (vol.) | 7-Day Cube Strength (psi) | 28-Day Cube Strength (psi) | 28-Day Cube Strength vs. Control |
|---|---|---|---|---|---|---|---|---|
| CA-1 | 276.9 | 19 | — | — | 1.07 | 1120 | 2190 | 1.00 |
| CA-2 | 264.6 | 19 | NaCl | 13.3 | 1.07 | 2180 | 4500 | 2.06 |
| CB-1 | 261.5 | 21 | — | — | 1.11 | 1430 | 2580 | 1.00 |
| CB-2 | 249.6 | 18 | NaCl | 12.9 | 1.11 | 2410 | 4890 | 1.90 |
| CB-3 | 244.2 | 20 | NaCl | 25.9 | 1.12 | 2420 | 5050 | 1.96 |
| CC-1 | 250.5 | 14 | — | — | 1.08 | 1480 | 3140 | 1.00 |
| CC-2 | 248.0 | 14 | NaCl | 13.3 | 1.10 | 2470 | 4230 | 1.35 |
| CC-3 | 238.1 | 13 | NaCl | 26.6 | 1.09 | 2590 | 4640 | 1.48 |

The remaining ingredients in each of the test samples are set forth in Table IV. The test samples were prepared and tested in accordance with the procedure described in Example 2, and the results are reported in Table IV. These results indicate that the present invention is applicable to cement compositions containing various types of fly ash or other pozzolan material and fine aggregate.

EXAMPLE 5

To demonstrate the effect of varying the cement:pozzolan ratio and the proportion of ionic constituents included within the cement composition the following series of tests were performed.

In tests DA-1 through DA-5 the control cement composition consisted of the following ingredients:
- 376 grams cement
- 330 grams fly ash
- 1240 grams sand
- 250 milliliters water The cement:pozzolan ratio for this composition is 0.88.

The base cement composition utilized in samples DB-1 through DB-6 consisted of the following:
- 376 grams cement
- 125 grams fly ash
- 1450 grams sand pared based on the following control composition:
- 564 grams cement
- 250 grams fly ash
- 1115 grams sand
- 270 milliliters water This composition has a cement:pozzolan ratio of 1.75.

Again the test samples were prepared and tested according to the procedure described in Example 2. The results and the remaining constituents in each test sample are reported in Table V.

The results indicate that the advantages of the present invention were achieved in the DA series of tests wherein the ingredients were proportioned in accordance with the present invention. For the DB and DC series of tests significant increases in the early compressive strength were not realized, because of the relatively low proportion of fly ash in these tests as indicated by the cement:pozzolan ratios of 2.33 and 8.74 respectively for each series. In test series DD significant improvement in the compressive strength of the cement composition was not achieved because of the large amount of cement already in the cement composition. It has been found that the benefits of the present invention are achieved if the ratio of the solid volume of cement to the volume of mortar (cement, pozzolan, water, air, ionic constituents and sand) is less than about 0.19.

TABLE V

| Test Sample | Total Water (cc/1000 cc composition) | Slump (16th") | Chemical | Chemical (grams) | Paste/Sand (vol.) | 7-Day Cube Strength (psi) | 28-Day Cube Strength (psi) | 28-Day Cube Strength vs. Control |
|---|---|---|---|---|---|---|---|---|
| DA-1 | 249.6 | 15 | — | — | 1.16 | 4630 | 7440 | 1.00 |
| DA-2 | 250.1 | 13 | NaCl | 4.7 | 1.16 | 5130 | 8710 | 1.17 |
| DA-3 | 244.3 | 13 | NaCl | 11.0 | 1.16 | 5900 | 9820 | 1.32 |
| DA-4 | 238.9 | 15 | NaCl | 21.9 | 1.15 | 6030 | 10,540 | 1.42 |
| DA-5 | 233.5 | 15 | NaCl | 31.4 | 1.15 | 5630 | 9720 | 1.31 |
| DB-1 | 256.8 | 12 | — | — | 0.84 | 4450 | 6490 | 1.00 |
| DB-2 | 256.5 | 15 | NaCl | 0.2 | 0.84 | 4590 | 6400 | 0.99 |
| DB-3 | 251.9 | 12 | NaCl | 2.3 | 0.84 | 4970 | 6490 | 1.00 |
| DB-4 | 249.6 | 11 | NaCl | 4.6 | 0.85 | 5090 | 6420 | 0.99 |
| DB-5 | 241.3 | 12 | NaCl | 9.1 | 0.86 | 5420 | 7000 | 1.08 |
| DB-6 | 232.8 | 11 | NaCl | 17.9 | 0.87 | 5230 | 7000 | 1.08 |
| DC-1 | 263.2 | 14 | — | — | 0.98 | 9170 | 10,120 | 1.00 |
| DC-2 | 256.8 | 14 | NaCl | 3.3 | 0.99 | 9500 | 10,270 | 1.02 |
| DC-3 | 249.8 | 13 | NaCl | 9.5 | 1.00 | 9670 | 10,130 | 1.00 |
| DC-4 | 245.1 | 13 | NaCl | 14.2 | 1.00 | 9170 | 10,000 | 0.99 |
| DD-1 | 273.2 | 14 | — | — | 1.39 | 8420 | 11,000 | 1.00 |

TABLE V-continued

| Test Sample | Total Water (cc/1000 cc composition) | Slump (16th") | Chemical | Chemical (grams) | Paste/Sand (vol.) | 7-Day Cube Strength (psi) | 28-Day Cube Strength (psi) | 28-Day Cube Strength vs. Control |
| --- | --- | --- | --- | --- | --- | --- | --- | --- |
| DD-2 | 267.8 | 14 | NaCl | 3.3 | 1.39 | 8790 | 11,020 | 1.00 |
| DD-3 | 265.1 | 14 | NaCl | 9.5 | 1.39 | 9290 | 11,690 | 1.06 |
| DD-4 | 260.8 | 13 | NaCl | 14.3 | 1.39 | 9060 | 11,370 | 1.03 |

EXAMPLE 6

To demonstrate that the advantages of the present invention are achieved because of the interaction of the pozzolan material and the ionic constituents, cement compositions were prepared in which the pozzolan material was replaced by granite dust, an inert material with a fine particle size. The control cement composition utilized in these test samples (EA-1 through EA-5) comprised the following:
- 376 grams cement
- 250 grams of granite dust passing through a 200 mesh screen
- 1240 grams sand
- 270 milliliters water The ratio of cement to fine granite dust on a dry volume basis is 1.22.

The procedure described in Example 2 was followed in the preparation and testing of the test samples. The remaining constituents in each test sample and the results of the tests are reported in Table VI. These test results indicate that the presence of ionic constituents which are effective in increasing the early strength of high pozzolan cement compositions are ineffective for the same purpose in cement compositions including a high content of fine inert material.

EXAMPLE 7

A series of tests were conducted to demonstrate that the present invention is applicable to cement compositions containing different types of Portland cement.

- 500 grams fly ash
- 1250 grams sand
- 253 milliliters of water

In test FB-1 through FB-3 the same control composition was utilized except that the cement utilized was a Type III Portland cement. The cement:pozzolan ratio in each of the control samples for the FA and FB Series of tests is 0.29.

Again the test samples were prepared and tested according to the procedure described in Example 2. The remaining constituents in each test sample and the results of the tests are reported in Table VII. The tests demonstrate that excellent results are achieved with the cement compositions of the present invention regardless of the type of cement which is utilized.

EXAMPLE 8

The purpose of this series of tests was to demonstrate that the present invention is applicable to cement compositions, such as those employed in manufacturing prefabricated structural elements, which are subjected to thermal treatment or autoclaving to accelerate the curing rate. The compositions of the test samples are indicated in Table VIII. Unless otherwise indicated the samples utilized a blend of three Type I Portland cements, Bowen fly ash, and a 50/50 blend of fine and coarse sands from Ottawa, Illinois as the major constituents as previously described in Example 1. The test procedure described in Example 2 was followed, except that the cubes formed from the various test samples were maintained in the laboratory for 24 hours at atmospheric conditions and then cured for 17 hours at a minimum temperature of 167 degrees Fahrenheit in water. The compressive strength of the cubes was then measured and the results are reported in Table VIII.

TABLE VI

| Test Sample | Total Water (cc/1000 cc composition) | Slump (16th") | Chemical | Chemical (grams) | Paste/Sand (vol.) | 7-Day Cube Strength (psi) | 28-Day Cube Strength (psi) | 28-Day Cube Strength vs. Control |
| --- | --- | --- | --- | --- | --- | --- | --- | --- |
| EA-1 | 270.4 | 16 | — | — | 1.14 | 3230 | 4600 | 1.00 |
| EA-2 | 264.4 | 15 | NaCl | 3.6 | 1.14 | 3520 | 4540 | 0.987 |
| EA-3 | 261.7 | 14 | NaCl | 8.0 | 1.14 | 3830 | 4640 | 1.009 |
| EA-4 | 261.0 | 20 | NaCl | 16.6 | 1.14 | 3590 | 4490 | 0.976 |
| EA-5 | 252.3 | 16 | NaCl | 23.8 | 1.16 | 3470 | 4500 | 0.978 |

TABLE VII

| Test Sample | Total Water (cc/1000 cc composition) | Slump (16th") | Chemical | Chemical (grams) | Paste/Sand (vol.) | 7-Day Cube Strength (psi) | 28-Day Cube Strength (psi) | 28-Day Cube Strength vs. Control |
| --- | --- | --- | --- | --- | --- | --- | --- | --- |
| FA-1 | 232.5 | 15 | — | — | 1.12 | 930 | 1790 | 1.00 |
| FA-2 | 220.0 | 15 | NaCl | 16.6 | 1.11 | 2550 | 5040 | 2.82 |
| FA-3 | 213.8 | 14 | NaCl | 33.3 | 1.12 | 2270 | 5640 | 3.15 |
| FB-1 | 238.4 | 14 | — | — | 1.13 | 1750 | 2930 | 1.00 |
| FB-2 | 232.8 | 14 | NaCl | 16.6 | 1.15 | 3430 | 6360 | 2.17 |
| FB-3 | 226.9 | 15 | NaCl | 33.3 | 1.14 | 3330 | 6940 | 2.37 |

In test samples FA-1 through FA-3 the control cement composition contained the following ingredients:
- 188 grams of a Type II Portland cement

TABLE VIII

| Test Sample | Cement (gms.) | Pozzolan (cc.) | Sand (gms.) | Total Water (cc/1000 cc composition) | Chemical | Chemical (gms.) | Paste/Sand (vol.) | Cement/Pozzolan (vol.) | Compressive Strength (psi) | Compressive Strength vs. Control |
|---|---|---|---|---|---|---|---|---|---|---|
| GA-1 | 188 | 102.46 | 1475 | 248 | — | — | 0.79 | 0.58 | 2900 | 1.00 |
| GA-2 | 188 | 102.46 | 1475 | 232 | NaCl | 16.6 | 0.79 | 0.58 | 4500 | 1.55 |
| GB-1 | 188 | 225.41 | 1222 | 243 | — | — | 1.23 | 0.27 | 4180 | 1.00 |
| GB-2 | 188 | 225.41 | 1222 | 222 | NaCl | 36.6 | 1.24 | 0.27 | 8310 | 1.99 |
| GC-1 | 376 | 135.24 | 1240 | 250 | — | — | 1.16 | 0.88 | 6580 | 1.00 |
| GC-2 | 376 | 135.24 | 1240 | 239 | NaCl | 21.9 | 1.15 | 0.88 | 10,310 | 1.57 |
| GD-1 | 188* | 204.92 | 1250 | 233 | — | — | 1.12 | 0.29 | 3250 | 1.00 |
| GD-2 | 188 | 204.92 | 1250 | 221 | NaCl | 16.6 | 1.11 | 0.29 | 6050 | 1.86 |
| GE-1 | 188** | 204.92 | 1250 | 238 | — | — | 1.13 | 0.29 | 5100 | 1.00 |
| GE-2 | 188 | 204.92 | 1250 | 227 | NaCl | 16.6 | 1.15 | 0.29 | 7150 | 1.40 |
| GF-1 | 188 | 163.84*** | 1290 | 251 | — | — | 1.07 | 0.36 | 3950 | 1.00 |
| GF-2 | 188 | 163.84 | 1290 | 238 | NaCl | 29.5 | 1.07 | 0.36 | 6050 | 1.53 |
| GG-1 | 188 | 204.92 | 1250 | 234 | — | — | 1.13 | 0.29 | 3930 | 1.00 |
| GG-2 | 188 | 204.92 | 1250 | 229 | NaCl | 17.8 | 1.13 | 0.29 | 7330 | 1.87 |
| GG-3 | 188 | 204.92 | 1250 | 215 | KCl | 23.9 | 1.13 | 0.29 | 6450 | 1.64 |
| GH-1 | 188 | 204.92 | 1250 | 238 | — | — | 1.13 | 0.29 | 4130 | 1.00 |
| GH-2 | 188 | 204.92 | 1250 | 198 | $Na_2SO_4 \cdot 10H_2O$ | 51.7 | 1.14 | 0.29 | 4780 | 1.16 |
| GH-3 | 188 | 204.92 | 1250 | 222 | $NaNO_2$ | 22.2 | 1.14 | 0.29 | 6200 | 1.50 |
| GI-1 | 188 | 204.92 | 1250 | 231 | NaCl | 10.7 | 1.13 | 0.29 | 6180 | — |
| GI-2 | 188 | 204.92 | 1250 | 229 | $CaCl_2$ | 11.3 | 1.13 | 0.29 | 6230 | — |

*In samples GD-1 and GD-2 a Type II Portland cement was utilized.
**In samples GE-1 and GE-2 a Type III Portland cement was utilized.
***The pozzolan material utilized in samples GF-1 and GF-2 was a natural pozzolan obtained from Oregon P.C. Co.

TABLE IX

| Test Sample | Cement (gms.) | Pozzolan (cc.) | Sand (gms) | Water Type | Water Amount | Paste/Sand (vol.) | Cement/Pozzolan (vol.) | 7-Day Cube Strength (psi) | 28-Day Cube Strength (psi) | 28-Day Cube Strength vs. Control |
|---|---|---|---|---|---|---|---|---|---|---|
| HA-1 | 188 | 102.46 | 1475 | City | 248 | 0.79 | 0.58 | 1150 | 2510 | 1.00 |
| HA-2 | 188 | 102.46 | 1475 | Sea Water | 240 | 0.79 | 0.58 | 1790 | 3940 | 1.57 |
| HB-1 | 188 | 143.44 | 1380 | City | 237 | 0.90 | 0.42 | 1400 | 2700 | 1.00 |
| HB-2 | 188 | 143.44 | 1380 | Sea Water | 230 | 0.89 | 0.42 | 2350 | 5130 | 1.90 |
| HC-1 | 188 | 184.43 | 1380 | City | 235 | 1.05 | 0.32 | 1520 | 2880 | 1.00 |
| HC-2 | 188 | 184.43 | 1380 | Sea Water | 235 | 0.92 | 0.32 | 2580 | 5530 | 1.92 |
| HD-1 | 188 | 183.96* | 1260 | City | 261 | 1.11 | 0.32 | 1430 | 2580 | 1.00 |
| HD-2 | 188 | 183.96 | 1260 | Sea Water | 255 | 1.11 | 0.32 | 2230 | 4090 | 1.59 |
| HE-1 | 188 | 163.84** | 1290 | City | 251 | 1.08 | 0.36 | 1480 | 3140 | 1.00 |
| HE-2 | 188 | 163.84 | 1290 | Sea Water | 252 | 1.08 | 0.36 | 2550 | 4200 | 1.34 |
| HF-1 | 188*** | 204.92 | 1250 | City | 233 | 1.12 | 0.29 | 930 | 1790 | 1.00 |
| HF-2 | 188 | 204.92 | 1250 | Sea Water | 235 | 1.12 | 0.29 | 1750 | 3860 | 2.16 |
| HG-1 | 188**** | 204.92 | 1250 | City | 238 | 1.13 | 0.29 | 1750 | 2930 | 1.00 |
| HG-2 | 188 | 204.92 | 1250 | Sea Water | 227 | 1.13 | 0.29 | 2870 | 5090 | 1.74 |
| HH-1 | 564 | — | 1400 | City | 260 | 0.93 | — | 7530 | 9960 | 1.00 |
| HH-2 | 564 | — | 1400 | Sea Water | 251 | 0.95 | — | 7940 | 9840 | 0.99 |
| HH-3 | 564 | 20.49 | 1343 | Sea Water | 257 | 0.99 | 8.74 | 8690 | 10,520 | 1.06 |
| HH-4 | 564 | 61.48 | 1240 | Sea Water | 256 | 1.14 | 2.91 | 9500 | 11,330 | 1.14 |
| HH-5 | 564 | 102.46 | 1115 | Sea Water | 268 | 1.40 | 1.75 | 8530 | 11,500 | 1.16 |

*The pozzolan material utilized in samples HD-1 and HD-2 was a New York fly ash.
**The pozzolan material utilized in samples HE-1 and HE-2 was a natural pozzolan obtained from Oregon P.C. Co.
***In samples HF-1 and HF-2 a Type II Portland cement was utilized.
****In samples HG-1 and HG-2 a Type III Portland cement was utilized.

The test results indicate that the present invention can be applied to cement compositions which are subjected to accelerated curing by heating. Again the presence of the ionic constituents improved the early compressive strength characteristics of these cement compositions.

EXAMPLE 9

Tests were performed to demonstrate that the advantages of the present invention are achieved when the ions are supplied in the form of sea water. The composition of the test samples is recorded in Table IX. Unless otherwise noted all samples utilized a blend of three Type I Portland cements, Bowen fly ash, and a 50/50 blend of fine and coarse sands from Ottawa, Illinois. The test samples were prepared and tested according to the procedure outlined in Example 2. The test results are reported in Table IX.

The test results indicate that the use of sea water in a high pozzolan content cement composition significantly increases the early strength of the product.

EXAMPLE 10

To demonstrate the economic advantages of the present invention a series of tests were performed comparing the relative cost of typical commercially available cement compositions not containing pozzolan material (tests IA-1 through IA-5), cement compositions containing pozzolan material as presently used in the industry (test samples IB-1 through IB-4), cement compositions containing a large proportion of pozzolan (test samples IC-1 through IC-4), and cement compositions containing a large proportion of pozzolan and sodium chloride in an amount equal to 6.65 wt percent of the pozzolan material (test samples ID-1 through ID-8). The test compositions employed cement comprising a blend of three Type I Portland cements, Bowen fly ash, and a 50/50 mixture of fine and coarse sands from Ottawa, Illinois.

The composition of these test samples is reported in Table X. Test samples were prepared and tested in accordance with the procedure set forth in Example 2, and the results of those tests are also reported in Table X. The cost of the cementitious material per yard of concrete was based on a cement cost of $1.80 per 100 pounds and a pozzolan cost of $0.50 per 100 pounds.

Figure 1:
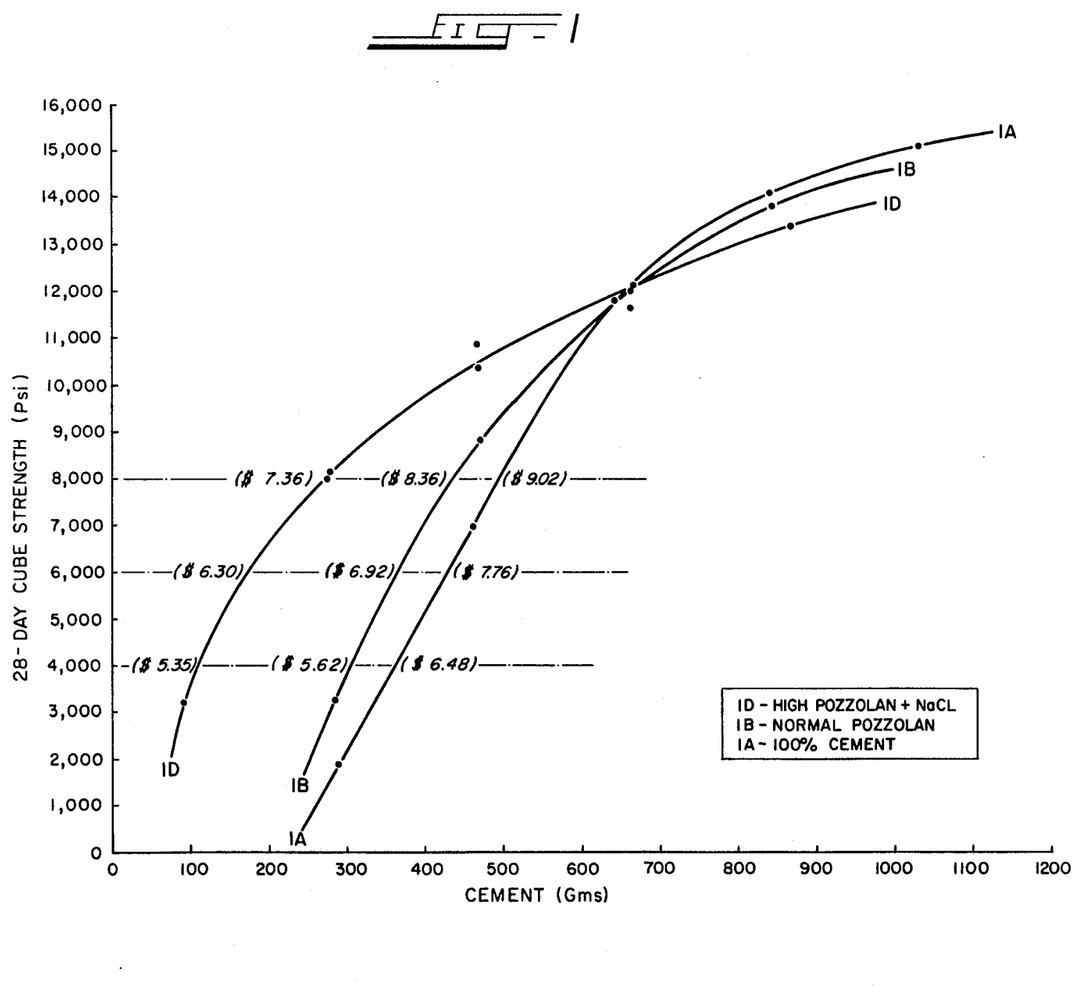
FIG. 1 is a graph depicting the 28-day compressive strength versus the cement content of various cement compositions, including commercially available cement compositions without pozzolan material (IA), cement compositions containing pozzolan material in amounts commercially utilized at the present time (IB), and cement compositions containing a large proportion of pozzolan material in accordance with the present invention (ID).

FIG. 1 is a graph of these test results for the IA, IB and ID series of tests, indicating the relationship between the amount of cement in a cement composition versus the 28-day strength of that composition. The graph indicates that for a given amount of cement the strength can be improved by adding pozzolan up to the normal amount used in commercially available cement compositions. However, as indicated by the IC series of tests, the early strength of the cement composition decreases if additional pozzolan is added without utilizing ionic constituents as employed in the present invention. Thus, any economic advantage associated with the use of pozzolan material in excess of the normal amount is offset by a decrease in structural properties.

EXAMPLE 11

Tests were performed to demonstrate the efficacy of utilizing potassium bromide as the source of the ionic constituents in cement compositions of the present invention. The control cement composition utilized in each of the tests JA-1 through JA-3 is as follows:
 188 grams Type I cement
 550 grams fly ash
 1170 grams Waugh sand
 247 milliliters water
Each of the samples utilized in this series of tests has a cement:pozzolan ratio of 0.26 and a paste:sand ratio of 1.26.

As indicated in Table XI, sample JA-1 contained 22.0 grams of sodium chloride or approximately 4 percent by weight of the fly ash. Otherwise stated, sample JA-1 contained 1.6 percent sodium ions and 2.4 percent chlorine ions by weight of the fly ash present. In sample JA-2 and JA-3 sufficient amounts of potassium bromide and potassium iodide were added respectively to supply ions in an equivalent weight of the sodium and chloride ions present in sample JA-1.

TABLE X

| Test Sample | Net Cement (gms.) | Pozzolan (gms.) | Sand (gms.) | Net Water (cc) | Net Voids | Slump (16th") | Paste/Sand (vol.) | Cement/Pozzolan (vol.) | 7-Day Cube Strength (psi) | 28-Day Cube Strength (psi) | Cost ($) |
|---|---|---|---|---|---|---|---|---|---|---|---|
| IA-1 | 289.5 | — | 1380 | 336.7 | 365.3 | 14 | 0.84 | — | 1300 | 1890 | 5.21 |
| IA-2 | 462.7 | — | 1380 | 300.3 | 332.6 | 12 | 0.92 | — | 4580 | 6960 | 8.33 |
| IA-3 | 643.9 | — | 1260 | 292.6 | 323.2 | 12 | 1.12 | — | 9000 | 11,790 | 11.59 |
| IA-4 | 842.7 | — | 1030 | 311.8 | 339.4 | 12 | 1.54 | — | 11,250 | 14,080 | 15.17 |
| IA-5 | 1033.6 | — | 800 | 339.9 | 365.5 | 14 | 2.26 | — | 12,500 | 15,120 | 18.60 |
| IB-1 | 285.0 | 126.3 | 1400 | 303.2 | 315.6 | 13 | 0.84 | 1.75 | 1900 | 3240 | 5.76 |
| IB-2 | 472.7 | 125.7 | 1280 | 291.7 | 305.2 | 15 | 1.03 | 2.91 | 6000 | 8820 | 9.14 |
| IB-3 | 664.8 | 126.3 | 1090 | 303.1 | 315.3 | 14 | 1.37 | 4.08 | 9250 | 12,000 | 12.60 |
| IB-4 | 844.1 | 124.7 | 880 | 324.3 | 344.5 | 15 | 1.97 | 5.24 | 11,250 | 13,820 | 15.81 |
| IC-1 | 92.0 | 645.8 | 1140 | 255.4 | 278.7 | 13 | 1.34 | 0.11 | 500 | 850 | 4.89 |
| IC-2 | 276.9 | 471.3 | 1140 | 272.0 | 290.1 | 15 | 1.33 | 0.46 | 2450 | 4140 | 7.34 |
| IC-3 | 468.6 | 279.2 | 1140 | 286.1 | 301.4 | 14 | 1.30 | 1.30 | 6100 | 8940 | 9.83 |
| IC-4 | 667.2 | 81.1 | 1140 | 291.0 | 312.0 | 15 | 1.26 | 6.37 | 9500 | 12,030 | 12.42 |
| ID-1 | 92.7 | 651.1 | 1140 | 235.8 | 272.5 | 14 | 1.32 | 0.11 | 1380 | 3200 | 4.93 |
| ID-2 | 277.4 | 472.2 | 1140 | 246.9 | 288.7 | 16 | 1.33 | 0.46 | 4150 | 8130 | 7.35 |
| ID-3 | 469.2 | 279.6 | 1140 | 268.6 | 300.4 | 13 | 1.29 | 1.23 | 7500 | 10,370 | 9.85 |
| ID-4 | 664.5 | 80.8 | 1140 | 285.8 | 314.8 | 13 | 1.27 | 6.37 | 9750 | 11,630 | 12.36 |
| ID-5 | 275.1 | 501.4 | 1100 | 259.0 | 296.1 | 14 | 1.43 | 0.42 | 4130 | 8000 | 7.46 |
| ID-6 | 468.6 | 367.9 | 1020 | 278.2 | 310.8 | 15 | 1.57 | 0.99 | 6700 | 10,880 | 10.27 |
| ID-7 | 670.1 | 227.1 | 950 | 298.0 | 323.5 | 13 | 1.70 | 2.29 | 9500 | 12,130 | 13.20 |
| ID-8 | 868.3 | 80.0 | 880 | 321.3 | 345.5 | 15 | 1.89 | 8.41 | 11,250 | 13,380 | 16.03 |

TABLE XI

| Test Sample | Total Water (cc/1000 cc composition) | Slump (16th") | Chemical | Chemical (grams) | Paste/Sand (vol.) | 7-Day Cube Strength (psi) | 33-Day Cube Strength (psi) |
|---|---|---|---|---|---|---|---|
| JA-1 | 241 | 18 | NaCl | 22.0 | 1.26 | 3550 | 7200 |
| JA-2 | 234 | 16 | KBr | 44.7 | 1.26 | 3650 | 7250 |
| JA-3 | 232 | 16 | KI | 62.4 | 1.26 | 2500 | 4600 |

As indicated by FIG. 1, significant economic advantages are achieved when excess pozzolan material is utilized in conjunction with the proper amounts of ions which accelerate the pozzolanic reaction. Cement compositions prepared in accordance with the present invention are significantly less expensive per unit volume than commercially available cement compositions having equivalent compressive strengths.

The line representing cement compositions of the present invention intersects the line corresponding to normal pozzolan cement compositions at the point where the ratio of the solid volume of cement to the volume of mortar is about 0.19.

The test procedures previously identified were followed with respect to samples JA-1 through JA-3 with the exception that the compressive strength was measured at the end of 33 rather than 28 days. The results are reported in Table XI. These results indicate that cement compositions of the present invention employing potassium bromide demonstrate strength characteristics at least as good as, if not better than, those employing sodium chloride. However, the same degree of strength improvement was not achieved when potassium iodide was utilized.

EXAMPLE 12

Tests were performed to demonstrate the efficacy of utilizing various ions in cement compositions of the present invention. The base cement composition utilized in each of the test series KA, KB, KC, KE, and KF is as follows:
- 188 grams Type I cement
- 500 grams Bowen fly ash
- 1250 grams of a 50/50 blend of sands from Ottawa, Ill.
- 247 milliliters water Each of the samples utilized in these series of tests has a cement:pozzolan ratio of 0.29 and a paste:sand ratio in the amount indicated in Table XII.

The base cement composition utilized in each of the test series KD and KG is as follows:
- 188 grams Type I cement
- 450 grams Bowen fly ash
- 1260 grams Shorter, a commercially available sand from Shorter, Ala.
- 247 milliliters water Each of these samples had a cement:pozzolan ratio of 0.32 and a paste:sand ratio as indicated in Table XII. Each of the samples contained ionic constituents of the type and amount indicated in Table XII.

The test procedures previously identified in Example 2 were followed with respect to samples KA through KG. In addition, identical samples were prepared and subjected to accelerated curing conditions as described in Example 8.

The test results are reported in Table XII.

TABLE XII

| Test Sample | Total Water (cc/1000 cc composition) | Slump (16th") | Chemical | Chemical (grams) | Paste/Sand (Vol.) | 7-Day Cube Strength (psi) | 28-Day Cube Strength (psi) | Accelerated Cube Strength (psi) |
|---|---|---|---|---|---|---|---|---|
| KA-1 | 231.9 | 14 | — | — | 1.12 | 2200 | 3630 | 4130 |
| KA-2 | 220.1 | 16 | NaCl | 20.0 | 1.12 | 3930 | 6900 | 6720 |
| KA-3 | 231.1 | 12 | NaSCN | 6.5 | 1.12 | 2500 | 4500 | 5950 |
| KA-4 | 223.4 | 16 | Na$_2$S$_2$O$_3$ | 9.6 | 1.12 | 3300 | 5170 | 4800 |
| KA-5 | 225.4 | 15 | NaSCN, Na$_2$S$_2$O$_3$ | 6.5, 3.2 | 1.12 | 2900 | 5450 | 6240 |
| KA-6 | 222.2 | 15 | NaSCN, Na$_2$S$_2$O$_3$ | 6.5, 6.4 | 1.12 | 3800 | 6090 | 6900 |
| KA-7 | 224.6 | 15 | NaSCN, Na$_2$S$_2$O$_3$ | 6.5, 9.6 | 1.12 | 4100 | 7090 | 6880 |
| KA-8 | 224.2 | 16 | NaSCN, Na$_2$S$_2$O$_3$ | 6.5, 12.7 | 1.12 | 4250 | 7320 | 7220 |
| KA-9 | 219.4 | 17 | NaSCN, Na$_2$S$_2$O$_3$ | 6.5, 15.9 | 1.13 | 4350 | 7660 | 7480 |
| KB-1 | 221.2 | 16 | NaCl | 20.0 | 1.12 | 3550 | 6940 | 7220 |
| KB-2 | 223.2 | 15 | Na$_2$S$_2$O$_3$ | 12.7 | 1.12 | 3530 | 5650 | 5150 |
| KB-3 | 222.6 | 14 | NaSCN, Na$_2$S$_2$O$_3$ | 2.5, 12.7 | 1.13 | 4100 | 6930 | 7040 |
| KB-4 | 222.6 | 17 | NaSCN, Na$_2$S$_2$O$_3$ | 5.0, 12.7 | 1.13 | 4150 | 7160 | 6900 |
| KB-5 | 219.6 | 15 | NaSCN, Na$_2$S$_2$O$_3$ | 7.5, 12.7 | 1.13 | 3930 | 7650 | 7570 |
| KB-6 | 220.6 | 15 | NaSCN, Na$_2$S$_2$O$_3$ | 10.0, 12.7 | 1.13 | 4200 | 7720 | 7630 |
| KB-7 | 220.3 | 16 | NaSCN, Na$_2$S$_2$O$_3$ | 12.5, 12.7 | 1.13 | 4200 | 7880 | 7380 |
| KB-8 | 217.8 | 18 | NaSCN, Na$_2$S$_2$O$_3$ | 15.0, 12.7 | 1.13 | 4250 | 8090 | 7690 |
| KB-9 | 218.3 | 17 | NaSCN, Na$_2$S$_2$O$_3$ | 17.5, 12.7 | 1.13 | 4250 | 8000 | 7850 |
| KB-10 | 215.2 | 15 | NaSCN, Na$_2$S$_2$O$_3$ | 26.0, 12.7 | 1.13 | 4030 | 8380 | 8130 |
| KC-1 | 217.0 | 16 | NaCl | 20.0 | 1.08 | 3700 | 6550 | 7650 |
| KC-2 | 216.4 | 12 | KCN, Na$_2$S$_2$O$_3$ | 5.6, 9.6 | 1.11 | 4600 | 7100 | 7790 |
| KC-3 | 219.2 | 16 | NaSCN, Na$_2$S$_2$O$_3$ | 7.5, 9.6 | 1.10 | 3750 | 6350 | 7550 |
| KD-1 | 248.9 | 18 | NaCl | 18.0 | 1.09 | 2500* | 5100 | 6850 |
| KD-2 | 250.4 | 17 | NaSCN | 12.5 | 1.08 | 2100* | 3900 | 6600 |
| KD-3 | 242.1 | 18 | NaSCN | 25.0 | 1.07 | 2550* | 4500 | 6930 |
| KE-1 | 230.1 | 17 | NaCl | 20.0 | 1.10 | 2900 | 6270 | 7070 |
| KE-2 | 228.5 | 17 | NaNO$_3$ | 10.0 | 1.10 | 2150 | 3930 | 4230 |
| KE-3 | 227.0 | 14 | KC$_3$H$_5$O$_3$ NaNO$_3$ | 1.37 10.0 | 1.10 | 2280 | 4420 | 5100 |
| KE-4 | 228.1 | 18 | KC$_3$H$_5$O$_3$ NaNO$_3$ | 2.74 10.0 | 1.10 | 2400 | 4700 | 5840 |
| KE-5 | 228.4 | 17 | KC$_3$H$_5$O$_3$ NaNO$_3$ | 4.11 10.0 | 1.10 | 2530 | 4840 | 6300 |
| KE-6 | 224.0 | 15 | KC$_3$H$_5$O$_3$ NaNO$_3$ | 5.48 10.0 | 1.09 | 2800 | 4940 | 6850 |
| KE-7 | 227.5 | 15 | KC$_3$H$_5$O$_3$ NaNO$_3$ | 6.85 10.0 | 1.09 | 3030 | 5430 | 7250 |
| KE-8 | 232.7 | 16 | KC$_3$H$_5$O$_3$ | 5.48 | 1.10 | 2600 | 4150 | 6450 |
| KE-9 | 224.3 | 14 | KC$_3$H$_5$O$_3$ NaNO$_3$ | 5.48 5.0 | 1.09 | 2700 | 4730 | 6920 |
| KE-10 | 220.5 | 15 | KC$_3$H$_5$O$_3$ NaNO$_3$ | 5.48 15.0 | 1.09 | 2900 | 5450 | 6570 |
| KF-1 | 234.5 | 14 | — | — | 1.11 | 2000 | 3350 | 4500 |
| KF-2 | 227.2 | 15 | NaCl | 10 | 1.10 | 3150 | 5700 | 6430 |
| KF3 | 227.0 | 20 | NaCl | 20 | 1.10 | 3070 | 6450 | 6900 |
| KF-4 | 222.9 | 14 | KC$_3$H$_5$O$_3$ NaNO$_3$ | 6.85 10.0 | 1.09 | 3180 | 5400 | 6850 |
| KF-5 | 230.0 | 17 | LiCl | 7.25 | 1.10 | 3050 | 5600 | 6550 |
| KF-6 | 224.2 | 16 | LiCl | 14.50 | 1.10 | 3250 | 6900 | 7130 |
| KF-7 | 228.2 | 18 | KCl | 12.73 | 1.10 | 3150 | 5450 | 6150 |
| KF-8 | 223.0 | 17 | KCl | 25.47 | 1.10 | 3150 | 5750 | 6400 |
| KG-1 | 243.0 | 16 | NaCl | 18.0 | 1.06 | 2700 | 5280 | 6970 |
| KG-2 | 240.2 | 16 | KCN | 20.0 | 1.06 | 3250 | 5480 | 7320 |

*Measured at the end of 5 rather than 7 days.

EXAMPLE 13

Tests were performed to demonstrate the efficacy of utilizing various combinations of anions in cement compositions of the present invention. The base cement compositions utilized in each of the test series LA and LB is as follows:
 188 grams Type I cement
 500 grams Bowen fly ash
 1250 grams of a 50/50 mixture of sands from Ottawa, Ill.
 247 milliliters water Each of the samples utilized in these series of tests had a cement:pozzolan ratio of 0.29 and a paste:sand ratio as indicated in Table XIII.

The base cement composition utilized in the LC series of tests is as follows:
 213 grams Type I cement
 500 grams Bowen fly ash
 1230 grams of a 50/50 mixture of sands from Ottawa, Ill.
 247 milliliters water Each of the samples utilized in the LC series of tests had a cement:pozzolan ratio of 0.33 and a paste:sand ratio as indicated in Table XIII. Each of the samples contained ionic constituents of the type and amount indicated in Table XIII.

The test procedures previously identified in Example 2 were followed with respect to test samples LA through LC. In addition identical samples were prepared and subjected to accelerated curing conditions as described in Example 8.

The test results are reported in Table XIII. These results indicate that various combinations of ions may be used in the cement compositions of the present invention.

TABLE XIII

| Test Sample | Total Water (cc/1000 cc composition) | Slump (16th") | Chemical | Chemical (grams) | Paste/Sand (Vol.) | 7-Day Cube Strength (psi) | 28-Day Cube Strength (psi) | Accelerated Cube Strength (psi) |
| --- | --- | --- | --- | --- | --- | --- | --- | --- |
| LA-1 | 225.0 | 17 | NaCl | 20.0 | 1.09 | 3350 | 6340 | 7230 |
| LA-2 | 233.1 | 16 | NaSCN | 6.5 | 1.09 | 2330 | 4300 | 5980 |
| LA-3 | 230.3 | 16 | $Na_2SO_4$ | 10.0 | 1.09 | 2850 | 4580 | 3750 |
| LA-4 | 224.5 | 14 | NaSCN | 6.5 | 1.09 | 3630 | 6070 | 6080 |
|  |  |  | $Na_2SO_4$ | 10.0 |  |  |  |  |
| LA-5 | 219.6 | 18 | NaSCN | 6.5 | 1.07 | 4380 | 7470 | 7050 |
|  |  |  | $Na_2SO_3$ | 2.0 |  |  |  |  |
|  |  |  | $Na_2SO_4$ | 10.0 |  |  |  |  |
| LA-6 | 216.7 | 18 | NaSCN | 6.5 | 1.07 | 4830 | 7630 | 6650 |
|  |  |  | $Na_2SO_4$ | 10.0 |  |  |  |  |
|  |  |  | $Na_2SO_3$ | 4.0 |  |  |  |  |
| LB-1 | 223.9 | 16 | NaCl | 20.0 | 1.09 | 3400 | 6830 | 6800 |
| LB-2 | 217.6 | 16 | $NaNO_3$ | 10.0 | 1.07 | 3500 | 5700 | 5280 |
|  |  |  | $Na_2S_2O_3$ | 9.6 |  |  |  |  |
| LB-3 | 218.5 | 16 | $NaNO_3$ | 9.5 | 1.07 | 3880 | 6980 | 6070 |
|  |  |  | $Na_2S_2O_3$ | 9.6 |  |  |  |  |
|  |  |  | NaSCN | 0.5 |  |  |  |  |
| LB-4 | 218.7 | 14 | $NaNO_3$ | 8.4 | 1.07 | 4300 | 7100 | 6930 |
|  |  |  | $Na_2S_2O_3$ | 9.6 |  |  |  |  |
|  |  |  | NaSCN | 1.5 |  |  |  |  |
| LB-5 | 218.5 | 16 | $NaNO_3$ | 6.3 | 1.07 | 4180 | 7250 | 7260 |
|  |  |  | $Na_2S_2O_3$ | 9.6 |  |  |  |  |
|  |  |  | NaSCN | 3.5 |  |  |  |  |
| LB-6 | 219.0 | 14 | $NaNO_3$ | 20.0 | 1.07 | 3200 | 5450 | 4950 |
| LB-7 | 221.8 | 16 | $NaNO_3$ | 17.4 | 1.08 | 3700 | 6690 | 6000 |
|  |  |  | NaSCN | 2.5 |  |  |  |  |
| LB-8 | 217.2 | 15 | $NaNO_3$ | 16.1 | 1.07 | 4150 | 6990 | 6640 |
|  |  |  | NaSCN | 2.5 |  |  |  |  |
|  |  |  | $Na_2SO_3$ | 0.5 |  |  |  |  |
|  |  |  | $Na_2SO_4$ | 0.6 |  |  |  |  |
| LB-9 | 215.3 | 16 | $NaNO_3$ | 14.8 | 1.06 | 4280 | 6950 | 6740 |
|  |  |  | NaSCN | 2.5 |  |  |  |  |
|  |  |  | $Na_2SO_3$ | 1.0 |  |  |  |  |
|  |  |  | $Na_2SO_4$ | 1.1 |  |  |  |  |
| LB-10 | 216.0 | 16 | $NaNO_3$ | 9.6 | 1.06 | 4650 | 7510 | 6640 |
|  |  |  | NaSCN | 2.5 |  |  |  |  |
|  |  |  | $Na_2SO_3$ | 3.0 |  |  |  |  |
|  |  |  | $Na_2SO_4$ | 3.4 |  |  |  |  |
| LC-1 | 226.1 | 17 | NaCl | 20.0 | 1.11 | 3300 | — | 7990 |
| LC-2 | 221.6 | 14 | NaCl | 2.0 | 1.07 | 3950 | — | 8200 |
|  |  |  | $Na_2SO_4$ | 1.0 |  |  |  |  |
|  |  |  | $Na_2SO_3$ | 1.0 |  |  |  |  |
|  |  |  | $NaC_7H_5O_3$ | 1.0 |  |  |  |  |
|  |  |  | $NaNO_3$ | 4.3 |  |  |  |  |

I claim:
1. A cement composition consisting essentially of:
cement, a pozzolan material, fine aggregate, air, water, at least one alkali metal constituent selected from the group consisting of sodium, potassium, and lithium ions, and at least one iron complexing anionic constituent which is capable of forming complexes with ferric ions, is soluble in water, and forms a calcium salt which is also water soluble;
the alkali metal constituent being present in an amount up to approximately 4.0 percent by weight, in terms of the equivalent weight of sodium ions, of the pozzolan material;
the iron complexing anionic constituent being present in an amount up to approximately 6.0 percent by weight, in terms of the equivalent weight of chloride ions, of the pozzolan material; and
the cement composition being further characterized by:

(a) having a solid volume ratio of cement to the pozzolan material within the range of approximately 0.05 to 2.0;

(b) having a ratio of the volume of paste (pozzolan material, cement, air, and water) to the solid volume of sand within the range of approximately 0.75 to 2.5; and (c) having a ratio of the solid volume of cement to the volume of mortar less than about 0.19.

2. The cement composition of claim 1 wherein the pozzolan material comprises fly ash.

3. The cement composition of claim 1 and further consisting of coarse aggregate.

4. The cement composition of claim 3 wherein the pozzolan material comprises fly ash.

5. The cement composition of claim 1 and further consisting of at least one chemical admix.

6. The cement composition of claim 5 and further consisting of coarse aggregate.

7. The cement composition of claim 6 wherein the pozzolan material comprises fly ash.

8. The cement composition of claim 1 and further consisting of at least one additional anion selected from the group consisting of thiosulfate, sulfate, sulfite, nitrate, and salicylate anions and wherein the total amount of such additional ions and said iron complexing anionic constituent constitute up to approximately 6.0 percent by weight, in terms of the equivalent weight of chloride ions, of the pozzolan material.

9. The cement composition of claim 8 and further consisting of coarse aggregate.

10. The cement composition of claim 9 wherein the pozzolan material comprises fly ash.

11. The cement composition of claim 10 and further consisting of at least one chemical admix.

12. The cement composition of claim 1, 2, 3, 4, 5, 6, 7, 8, 9, 10, or 11 and further consisting of extraneous lime in an amount less than 4.0 percent by weight of the pozzolan material.

13. The cement composition of claim 12 wherein: the solid volume ratio of cement to the pozzolan material is within the range of approximately 0.1 to 2.0; and the ratio of the volume of paste to the solid volume of sand is within the range of approximately 1.0 to 2.0.

14. The cement composition of claim 13 wherein the alkali metal constituent is present in an amount within the range of approximately 0.2 to 1.6 percent by weight in terms of the equivalent weight of sodium ions, of the fly ash, and the total iron complexing anionic constituent and any additional anion are present in an amount within the range of approximately 0.1 to 2.4 percent by weight, in terms of the equivalent weight of chloride ions, of the pozzolan material.

15. The cement composition of claim 14 wherein the alkali metal ion constituent comprises sodium ions.

16. The cement composition of claim 14 wherein the alkali metal constituent comprises potassium ions.

17. The cement composition of claim 13 wherein the alkali metal constituent comprises lithium ions.

18. A cement composition comprising cement, a pozzolan material, fine aggregate, air, water, and at least one alkali metal constituent selected from the group consisting of sodium, potassium, and lithium ions and at least one anionic constituent selected from the group consisting of chloride, bromide, nitrite, thiocyanate, cyanide, and lactate ions wherein:

the alkali metal constituent is present in an amount up to approximately 4.0 percent by weight, in terms of the equivalent weight of sodium ions, of the pozzolan material;

the anionic constituent is present in an amount up to approximately 6.0 percent by weight, in terms of the equivalent weight of chloride ions, of the pozzolan material; and the cement composition is further characterized by:

(a) having a solid volume ratio of cement to the pozzolan material within the range of approximately 0.05 to 2.0;

(b) having a ratio of the volume of paste (pozzolan material, cement, air, and water) to the solid volume of sand within the range of approximately 0.75 to 2.5; and (c) having a ratio of the solid volume of cement to the volume of mortar less than about 0.19.

19. The cement composition of claim 18 wherein the pozzolan material comprises fly ash.

20. The cement composition of claim 18 and further consisting of coarse aggregate.

21. The cement composition of claim 20 wherein the pozzolan material comprises fly ash.

22. The cement composition of claim 18 and further consisting of at least one chemical admix.

23. The cement composition of claim 22 and further consisting of coarse aggregate.

24. The cement composition of claim 23 wherein the pozzolan material comprises fly ash.

25. The cement composition of claim 18 and further consisting of at least one additional anion selected from the group consisting of thiosulfate, sulfate, sulfite, nitrate and salicylate anions and wherein the total amount of such ions and iron complexing anions constitutes up to approximately 6.0 percent by weight, in terms of the equivalent weight of chloride ions, of the pozzolan material.

26. The cement composition of claim 25 and further consisting of coarse aggregate.

27. The cement composition of claim 26 wherein the pozzolan material comprises fly ash.

28. The cement composition of claim 27 and further consisting of at least one chemical admix.

29. The cement composition of claim 18, 19, 20, 21, 22, 23, 24, 25, 26, 27, or 28 and further consisting of extraneous lime in an amount less than 4.0 percent by weight of the pozzolan material.

30. The cement composition of claim 29 wherein: the solid volume ratio of cement to the pozzolan material is within the range of approximately 0.1 to 2.0; and the ratio of the volume of paste to the solid volume of sand is within the range of approximately 1.0 to 2.0.

31. The cement composition of claim 30 wherein the alkali metal constitute is present in an amount within the range of approximately 0.2 to 1.6 percent by weight in terms of the equivalent weight of sodium ions, of the fly ash, and the anionic constituent and any additional anion are present in an amount within the range of approximately 0.1 to 2.4 percent by weight, in terms of the equivalent weight of chloride ions, of the pozzolan material.

32. The cement composition of claim 31 wherein the alkali metal constituent comprises sodium ions.

33. The cement composition of claim 31 wherein the alkali metal constituent comprises lithium ions.

34. The cement composition of claim 31 wherein the alkali metal constituent comprises potassium ions.

35. The cement composition of claim 31 wherein the alkali metal and anionic constituents are provided in the form of sea water.

36. A cement composition consisting essentially of: cement, a pozzolan material, fine aggregate, water, and calcium chloride;
the calcium chloride being present in an amount comprising approximately 0.5 to 4.0 percent by weight of the pozzolan material; and
the cement composition being further characterized by:
(a) having a solid volume ratio of cement to the pozzolan material within the range of approximately 0.05 to 2.0;
(b) having a ratio of the volume of paste to the solid volume of sand within the range of approximately 0.75 to 2.5; and
(c) having a ratio of the solid volume of cement to the volume of mortar less than about 0.19.

37. The cement composition of claim 36 wherein the pozzolan material comprises fly ash.

38. The cement composition of claim 36 and further consisting of coarse aggregate.

39. The cement composition of claim 38 wherein the pozzolan material comprises fly ash.

40. The cement composition of claim 36 and further consisting of at least one chemical admix.

41. The cement composition of claim 40 and further consisting of coarse aggregate.

42. The cement composition of claim 41 wherein the pozzolan material comprises fly ash.

43. The cement composition of claim 36 and further consisting of at least one alkali metal ion selected from the group consisting of sodium, potassium, and lithium ions.

44. The cement composition of claim 43 and further consisting of at least one additional anion selected from the group consisting of bromide, nitrite, thiocyanate, cyanide, lactate, thiosulfate, sulfate, sulfite, nitrate, and salicylate anions and wherein the total amount of such ions and chloride ions comprises up to approximately 6.0 percent by weight, in terms of the equivalent weight of chloride ions, of the pozzolan material.

45. The cement composition of claim 44 and further consisting of coarse aggregate.

46. The cement composition of claim 45 wherein the pozzolan material comprises fly ash.

47. The cement composition of claim 46 and further consisting of at least one chemical admix.

48. The cement composition of claim 36, 37, 38, 39, 40, 41, 42, 43, 44, 45, 46, or 47 and further consisting of extraneous lime in an amount less than 4.0 percent by weight of the pozzolan material.

49. The cement composition of claim 48 wherein: the solid volume ratio of cement to the pozzolan material is within the range of approximately 0.1 to 2.0; and the ratio of the volume of paste to the solid volume of sand is within the range of approximately 1.0 to 2.0.

50. The cement composition of claim 49 wherein the chloride ions and any anionic constituent are present in an amount within the range of approximately 0.1 to 2.4 percent by weight, in terms of the equivalent weight of chloride ions, of the pozzolan material.

* * * * *

UNITED STATES PATENT AND TRADEMARK OFFICE
CERTIFICATE OF CORRECTION

PATENT NO. : 4,256,500

DATED : March 17, 1981

INVENTOR(S) : Raymond C. Turpin, Jr.

It is certified that error appears in the above—identified patent and that said Letters Patent is hereby corrected as shown below:

In Column 4, line 14     "cement-pozzolan" should be -- cement:pozzolan --

In Column 4, line 16     "cement-pozzolan" should be -- cement:pozzolan --

In Column 9, line 23     "in situ" should be -- *in situ* --

In column 12, line 66     "Example 1" should be -- Example 1. --

In Column 13, line 10     "were" should be -- with --

In Column 13, line 65     Begin a new sentence on new line following "water"

In Column 14, line 4     Begin a new sentence on new line following "water"

In Table VIII - Column 19 - second column hearing "C.ment" should be -- Cement --

In Table XII - line KB-9 under the heading Chemical "NaSCN, $Na_2Shd$" should be -- NaSCN, $Na_2S_2O_3$ --

UNITED STATES PATENT AND TRADEMARK OFFICE
CERTIFICATE OF CORRECTION

PATENT NO. : 4,256,500

DATED : March 17, 1981

INVENTOR(S) : Raymond C. Turpin, Jr.

It is certified that error appears in the above—identified patent and that said Letters Patent is hereby corrected as shown below:

In Table XII - line between KB-9 and KB-10 under the heading Chemical "$20_3$" should be deleted.

In Table XII - line KD-3 - "2550*" should be -- 2250* --

In Column 28, line 54 "constitute" should be -- constituent --

Signed and Sealed this

Sixteenth Day of August 1983

[SEAL]

Attest:

GERALD J. MOSSINGHOFF

Attesting Officer

Commissioner of Patents and Trademarks